E. A. SACKERMAN.
DEVICE FOR THAWING FROZEN PIPES OR THE LIKE.
APPLICATION FILED FEB. 6, 1918.
1,316,190.
Patented Sept. 16, 1919.
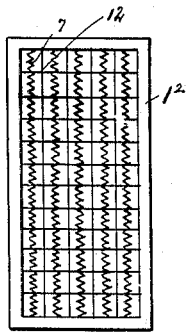
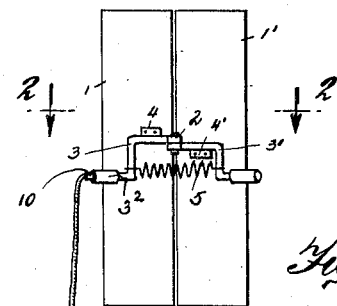
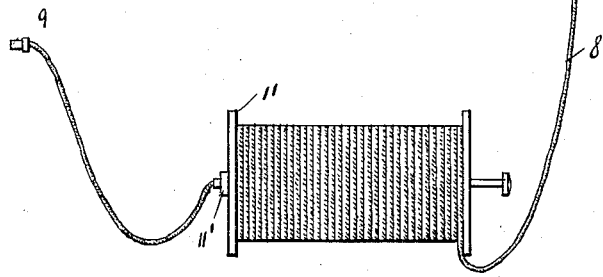
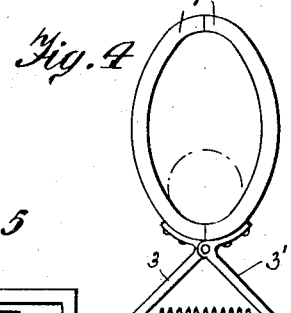
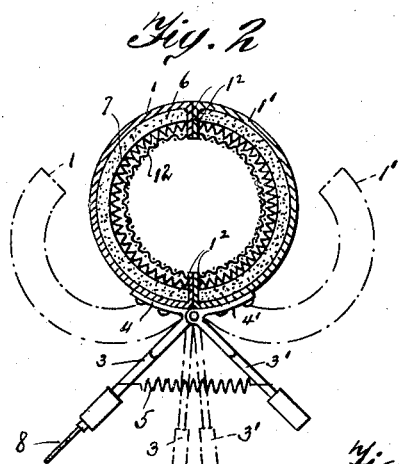
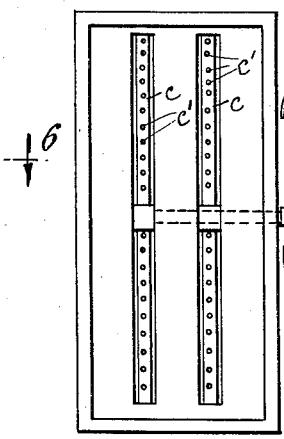
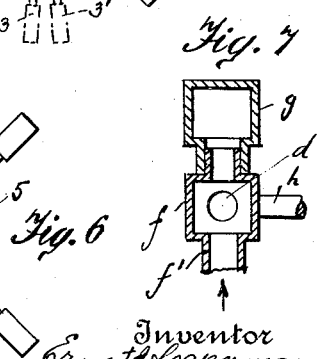
Inventor
Ernest A. Sackerman
By his Attorney

UNITED STATES PATENT OFFICE.

ERNEST A. SACKERMAN, OF HACKENSACK, NEW JERSEY.

DEVICE FOR THAWING FROZEN PIPES OR THE LIKE.

1,316,190. Specification of Letters Patent. Patented Sept. 16, 1919.

Application filed February 6, 1918. Serial No. 215,703.

*To all whom it may concern:*

Be it known that I, ERNEST A. SACKERMAN, a citizen of the United States of America, residing at Hackensack, in the county of Bergen and State of New Jersey, have invented certain new and useful Improvements in Devices for Thawing Frozen Pipes or the like, of which the following is a specification.

The present invention has reference to plumbers' tools for thawing frozen pipes. Hitherto to accomplish this object so-called plumbers' torches have been used which however are unsatisfactory for the reason that the flames of the torch can be directed against one point of the pipe at a time and the torch must be moved from place to place and around the periphery of the pipe in order to obtain proper results. This more or less tedious work entails loss of time and so the torch is held by the hand of the plumber, he is unable to attend to any other work during the thawing of the pipe.

My invention has as its principal object to obviate these drawbacks by providing a device which will more effectively and speedily accomplish the object.

Another object of my invention is to so construct the device that the same can be temporarily fixed to the pipe to be thawed, thereby relieving the plumber and permitting him to attend to other work while the thawing takes place.

A further object of my invention is to provide a construction of the device which will render it applicable to various sizes of pipes.

A still further object of my invention is to produce a device, the handling of which will not require any particular skill, but can be used by anybody just like any other household tool.

With these and other objects in view my invention substantially consists of a foldable and expansible heating device of suitable shape capable of embracing part of the periphery of a gas, water pipe or the like, and of being retained thereon by itself in position.

More specifically my device includes two suitably curved plate or frame sections so connected with one another as to be capable of closing and opening, and adapted to be mounted around that portion of a pipe which is to be thawed. These sections are each provided on their inner surfaces with suitable heating means, which may be made either in form of electrical incandescent wires like those employed in electric bread toasters or may be provided with gas pipes having a number of burners or burner openings. In the case of incandescent wires, the electricity may be furnished from a lighting source or any other suitable source through the medium of electric wire cords, at one end of which the usual plug is provided for insertion into the lamp socket and the other end of which is provided within the usual terminals for connection with the resistance. In the case of gas heating, the gas is supplied to the gas pipes within the sections of the frame through the medium of gas connections, which by a hose may be attached to a suitable gas source.

My invention also consists in the particular construction, combination and arrangement of parts as will be hereinafter more fully described and set forth in the appended claims.

My invention will be more fully understood by reference to the accompanying drawing in which similar reference characters denote corresponding parts and in which Figure 1 is an elevation of my device showing the sections from the outside with the pivotal connection thereof, the means for opening and closing the same and also the electric cord through the medium of which electricity is supplied; Fig. 2 is a cross section on line 2—2 of Fig. 1, showing the inner construction of the frame or plate sections, the dotted lines illustrating the sections in open position; Fig. 3 is an elevation of one of the sections as seen from the inside showing the heating apparatus consisting of a number of incandescent wires; Fig. 4 is a top plan view of the device with the heating parts omitted, showing the frame or plate sections as being curved elliptically instead of circularly as shown in Fig. 2; Fig. 5 is an inner elevation of a modified form of the device from which one of the sections has been removed and in which the heating apparatus consists of gas pipes; Fig. 6 is a cross section on line 6—6 of Fig. 5, showing the two sections assembled and Fig. 7 is an enlarged section on line 7—7 of Fig. 6 showing the pivotal connection between the two sections and the gas connection for the gas pipes of the two sections.

Referring first to the construction shown in Figs. 1 to 4 inclusive, 1, 1 denote two sections in form of plates or the like made of metal or other suitable material and which in cross section are curved circular as shown in Fig. 2. But preferably the sections may be curved elliptically as shown in Fig. 4 or in any other suitable way to allow of their being accommodated around a pipe or pipes of various sizes in diameter or shape in cross section. These two sections 1, 1 are made of a suitable uniform length so that when mounted around a pipe, the same will embrace a relatively large area and therefore enable the heating or thawing of a comparatively large portion of the pipe at a time. The two sections are so connected with each other as to enable their being opened and closed or folded and expanded in order to allow their application to and removal from the pipe. In the present embodiment of my invention I use an ordinary hinge connection 2 and provide on each section arms 3, 3' respectively which project from the parts constituting the hinge 2 and which are fixed to their respective sections at 4, 4' respectively. These arms project forwardly from the surface of their respective sections so that when the sections are in closed position as shown in Fig. 2 they extend at an angle to one another. Between these two arms 3, 3' a pressure spring 5 is provided, the ends of which are suitably fixed to the arms and whose object is to spread the arms so as to maintain the sections in closed position, or when the same are applied to a pipe to effectively clamp them around the pipe and thereby secure the sections around the periphery of the latter. In order to remove the device from the pipe, the arms are pressed toward one another against the tension of the spring 5 whereby the sections will be swung open as indicated by dotted lines in Fig. 2 and thereby released from around the periphery of the pipe. Extending over the entire inner face of each section and suitably fastened thereto, is a layer of asbestos 6 or other heat non-conductive material. Stretched over the outer face of the asbestos layer to extend longitudinally thereover and substantially parallel to each other are a number of coiled incandescent wires 7 suitably fastened in position and insulated by suitable means (not shown) from the sections or shells 1, 1, which coils constitute the heating means and correspond with those usually employed in the well known bread toasters or other electric heating devices. These wires, when an electric current is passed therethrough, will be heated to red heat which will be utilized for thawing the gas or water pipe. Electricity may be supplied to these coils 7 from any electric source through the medium of the ordinary electric cords 8, one end of which is provided with the usual plug 9 to be screwed into an electric lamp socket and the other end with a plug 10 to be screwed into socket $3^2$ formed in one of the handles 3. The electric connections between the wires 7 and the socket $3^2$ may be arranged in the manner well known with electric lamp sockets, electric irons or other electric devices, and need not be illustrated. As the pipes to be thawed may be located at relatively long distances from the source of electric power, the electric cord will have to be of considerable length in order to permit the device to be applied to any pipe in a certain locality. In order that the cord may not be dragged on the floor or may not become entangled with other objects, I provide a spool or reel 11 around which the cord is wound. To properly guide the cord over the reel or spool or to prevent its detachment therefrom, one end of the cord may be passed through a socket 11' or the like provided on the spool.

To prevent injury to the incandescent filaments or wires 7 of the sections 1, 1' when applied to a pipe, a suitable shield may be used which in the present embodiment of my invention is in the form of a wire netting 12. This wire netting extends over the entire area occupied by the system of incandescent wires or filaments 7 of each section and is arranged as close as possible thereto in order to permit the surface of the pipe to be thawed to come as near as possible to the source of heat. In the present embodiment of my invention each section is provided on its inner surface with marginal flanges $1^2$, the free edges of which project but slightly beyond the surface formed by the system of wires. To these free edges of the flanges, the wire netting 12 is suitably secured as shown in Figs. 2 and 3. It will be seen that when the sections are engaged around the pipe, the shield 12 will prevent the pipe from coming in contact with the incandescent wires 7.

When receiving a circular or more exactly a cylindrical shape, the device will be more or less limited to pipes of a certain diameter and the device will have to be made in different sizes to fit differently sized pipes. In order that the device may be applicable to pipes of different sizes, the sections $1^a$, $1^a$ can advantageously be given an elliptical curvature in cross section as shown in Fig. 4 or curved in any other suitable manner so that it could be easily clamped around the periphery of pipes of different diameter or shape. In every other respect the device of the form shown in Fig. 4 is constructed as that of Fig. 2.

Instead of using electric power, the device may be heated by gas. Such construction is illustrated in the modification shown in Figs. 5 and 6. Here $a$ and $b$ denote the shells or outer section of the device, which like shells 1, 1 may be circular plates as shown, or plates of elliptical or other suitable curvature. Embedded in each section are a number of longitudinally extending parallel gas pipes *c* closed at their ends and each having a number of burner openings *c'* opening into the interior of each shell or into the space formed by the shells when closed. These gas pipes are suitably mounted and secured in position within the shells and are connected with gas supply pipes *d, e* by means of elbow pipes *d'*. The pipes *d, e* terminate into a hinged socket *f, g*, the parts of which are suitably secured to the sections or shells *a, b* and which are formed with arms or handles *h, h'* between which, as in the first construction, the spring 5 is provided. One of the parts of the hinge socket is provided with a nipple *f'* to which a hose *i* may be applied for the connection of the device with the gas supply (not shown). The nipple *f'* may be provided with an air supply cock or valve *j* (Fig. 5) to allow the regulation of air and whereby the device, if desired, may also be utilized for heating soldering irons.

To prevent the burner openings from being closed by the surface of the pipe when the device is applied thereto, a shield *k* of wire netting or the like similarly arranged as netting 12 is stretched over the burners *c'* and suitably fastened to the marginal flanges of the shells.

While the construction shown and described has proved to be effective, it is understood that the same may be easily modified by those skilled in the art. I therefore do not wish to limit myself to the details of the construction, and what I claim and desire to secure by Letters Patent is:

1. A device for thawing frozen pipes, comprising two curved shells pivotally connected to each other to be capable of opening and closing and to be mounted around the pipe to be thawed, means for retaining said shells in operative position on said pipe, a system of heating members on the inner surface of said shells, and means for connecting said heating members to a heat supply source.

2. A device for thawing frozen pipes, comprising two curved shells hinged to one another to be capable of being opened and closed around the periphery of a pipe to be thawed, means including a spring for normally holding said shells in closed position and capable of clamping the same to the pipe, and heating means on the inner surface of each shell.

3. A device for thawing frozen pipes, comprising shells or sections hinged to one another to be capable of being mounted around the periphery of a pipe to be thawed, heat producing means on the inner surface of each section, arms projecting from each section, and a spring between said arms to normally hold said sections closed and serving to clamp the said device to the pipe.

4. A device for thawing frozen pipes or the like, comprising curved shells connected together so as to be capable of expansion and contraction, a lining of heat non-conducting material on the inner surface of each shell, heating means mounted on the top of said lining in each section, and spring actuated arms projecting from the said shells near their joint and serving as handles, said spring serving to close or contract said shells.

5. A device for thawing frozen pipes, comprising separable heating members arranged to form an inclosure of substantially elliptical formation in cross section, said members being adapted to surround pipes of various sizes with portions of said members in contact therewith, and other portions thereof in spaced and exposed relation thereto.

In testimony whereof I affix my signature in presence of two witnesses.

ERNEST A. SACKERMAN.

Witnesses:
 MAX ORDMANN,
 ALEX ORDMANN.